Nov. 26, 1940.                    M. WARD                    2,222,826
                            TEMPERATURE REGULATOR
                             Filed Sept. 18, 1937
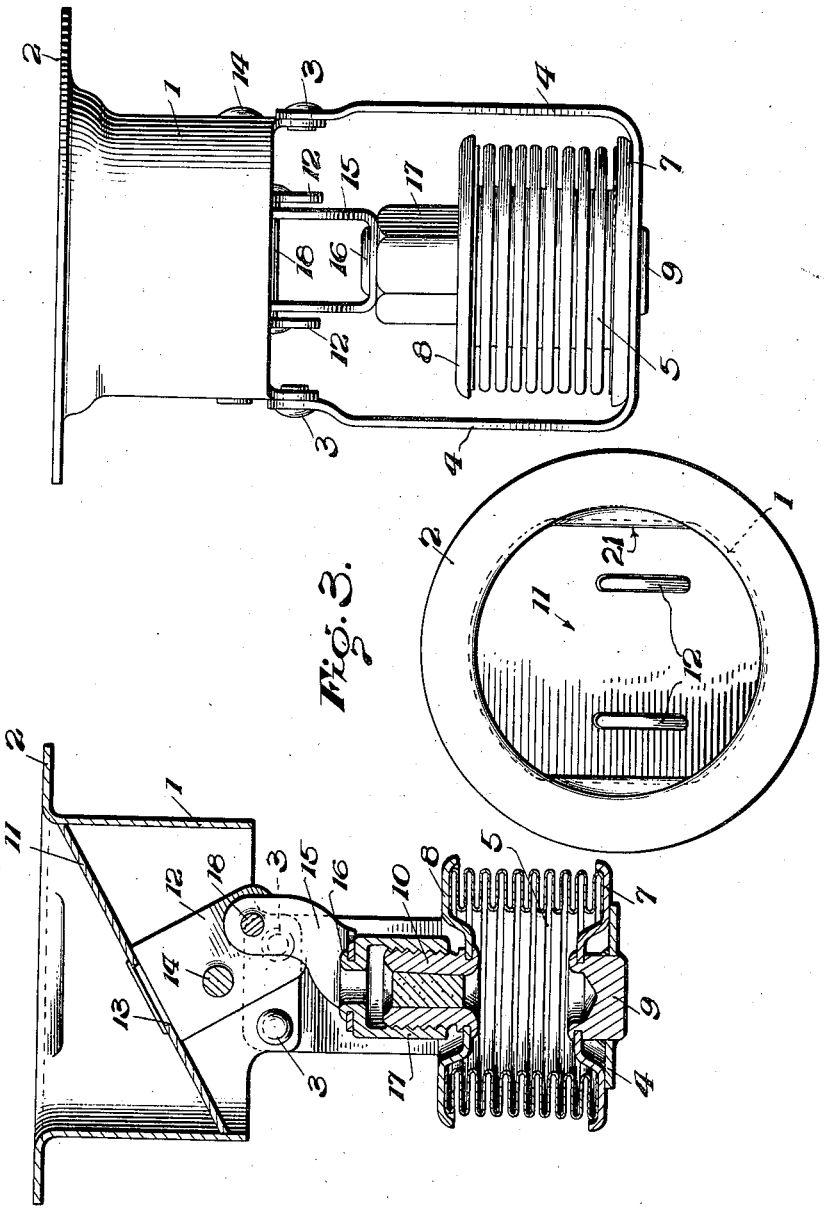
Inventor
Marshall Ward.
By Cameron, Kerkam + Sutton
Attorneys Patented Nov. 26, 1940

2,222,826

UNITED STATES PATENT OFFICE 2,222,826

TEMPERATURE REGULATOR

Marshall Ward, Southport, Conn., assignor to Bridgeport Thermostat Company, Inc., Bridgeport, Conn., a corporation of Delaware Application September 18, 1937, Serial No. 164,577

5 Claims. (Cl. 236—34)

This invention relates to temperature regulators, and more particularly to temperature regulators for controlling the circulation of cooling medium through the cooling system of an internal combustion engine and of the type employing a butterfly valve.

Various forms of temperature regulators employing thermostatically operated butterfly valves have heretofore been proposed, but difficulty has been encountered in obtaining the desired operation because of the changing values of effective pressure, due to the kinetic action of the cooling medium, that occur during the opening and closing movements of the valve member. In such a structure the valve member is moved pivotally from a position transverse with respect to the passage, and wherein static pressure is applied to the portions of the valve member at opposite sides of its pivot, through various intermediate positions wherein the angle of the valve member with respect to the direction of flow assumes different values as does also the effect of the kinetic action of the cooling medium on the portions of the valve member at opposite sides of its axis. Various suggestions have been made in an effort to overcome these difficulties, including varying locations of the pivot, various forms and constructions of operating connection from the thermostat to the valve member, various forms of valve member, the use of associated baffles, etc. If the pivot is displaced along the plane of the valve to secure an unbalanced valve member, even though the fit of the valve member in the passage be altered, only a small amount of unbalance can be obtained, because a valve of elliptical contour can only be swung on an axis which intersects the axis of the conduit if it exactly fits the conduit and only a small displacement of the pivot can be obtained within the permissible alterations of fit.

I have discovered that if a butterfly valve member is carefully balanced about a pivot whose axis intersects the axis of the conduit in which it is disposed, fluid pressure tends to open the valve member to an intermediate position of balance and thereafter to resist movement of the valve member to fully open position, and this tendency of the valve member to open can be increased, with a decrease in its resistance to movement to its fully open position, if the axis of the pivot is located outside of the plane of the valve so that it may be displaced laterally of the normal at the center of the valve member toward the upstream edge thereof but retained in a position to intersect the axis of the conduit. Under such circumstances the thermostat, in the closed position of the valve member, has only to resist the opening tendency of the valve member, and thereafter, upon initiation of the opening movement with rise in temperature, the thermostat functions to restrain the valve member and control its rate of opening, because the tendency of the pressure is to cause further opening movement of the valve member although with a progressively decreasing force. As the valve member continues to open, however, there is a position where the pressures on the valve member become balanced, and thereafter further opening movement is resisted, so that a positive pressure must be exerted by the thermostat to continue the movement of the valve member toward fully open position. The force required to complete the opening movement gradually increases as the valve member approaches its fully open position, but it does not attain a magnitude which is any higher than, but usually lower than, that required to hold the valve member in closed position.

Conversely, when the closing movement is initiated from fully open position the effective pressures tend to move the valve member toward closing position and the thermostat functions to restrain the valve member and control the rate of movement until the valve member has reached its position of balance, after which a positive force is required to move the valve member toward fully closed position, this force again being a gradually increasing one.

By arranging the axis of the pivot outside of the plane of the valve, so that it is displaced laterally of the normal at the center of the valve member but intersects the axis of the conduit, I found that the thermostat functions to hold the valve member in either its fully closed or its fully open position against the net effective pressure exerted by the cooling medium on the valve member, and the movement of the valve member from its fully open or its fully closed position, as permitted by the movement of the thermostat, is effected by the net effective pressure of the cooling medium thereon until the valve member has reached its intermediate position of balance, beyond which the further movement to fully closed or fully open position is effected against a gradually increasing resistance until the valve member reaches its limit of movement, in which position the thermostat again functions to hold the valve member against the pressure of the cooling medium.

In order that advantage may best be taken of the foregoing tendencies of the valve member to move under the action of the fluid pressure to an intermediate position of balance the connections between the thermostat and the valve member should preferably be such that there is little variation in the leverage of the members transmitting the force of restraint or pressure. Thus where the valve member is connected to the thermostat by a crank arm type of movement-transmitting member such crank arm should be so disposed that its effective length varies to a minimum extent during the movement of the valve member from its fully open to its fully closed positions or vice versa.

Application of the foregoing principles to a temperature regulator enables the use of a simple form of butterfly valve member and movement-transmitting mechanism together with a thermostat which need not develop much power and therefore which may be made of relatively small and light construction.

It is therefore an object of this invention to provide a temperature regulator of the butterfly valve type wherein the pivotal axis of the valve member is so disposed laterally of the normal at the center of the valve member that in fully open and fully closed positions the net effective pressure of the cooling medium tends to move the valve member toward an intermediate position of balance and said valve member may be moved to and held in either fully open or fully closed position by the application of a relatively small force thereto.

Another object of this invention is to provide a temperature regulator of the butterfly valve type wherein the connections between the thermostat and the valve member avoid any substantial variation in the leverage of force-transmitting members during the opening and closing movements of the valve member.

Another object of this invention is to provide a device of the type characterized which is composed of a relatively few number of simple and easily fabricated parts to the end that the regulator may be made and assembled at a relatively low cost and yet, at the same time, it is efficient in operation and adapted to control closely the rate of flow of cooling medium in conformity with variations in the temperature thereof.

Other objects will appear as the description of the invention proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

Referring in detail to the drawing, Fig. 1 illustrates, somewhat diagrammatically, a preferred embodiment of the present invention, partly in section for clarity of illustration, Fig. 2 is an elevational view at right angles to Fig. 1 and Fig. 3 is an end view thereof.

As shown, the temperature regulator includes a tubular supporting member 1 in the form of a cylinder flattened symmetrically with respect to its axis at opposed sides as shown at 21 and providing a conduit therethrough, said member 1 having suitably attached thereto or formed integrally thereon a flange 2 by which the same may be mounted in position in any suitable relation to the system for circulating the cooling medium, but if preferred the flange may be omitted so that the unit to be described can be slid into a pipe, hose, or other conduit of the system. Depending from opposite sides of the tubular member 1 and attached thereto in any suitable way, as by rivets 3, is a U-shaped strap 4. If preferred, however, said strap may be formed integrally with the tubular member 1. Mounted on said strap 4 is a thermostat 5 of any suitable size and construction but it is preferably of the type employing a corrugated tubular expansible and collapsible metal wall or bellows 6 which is hermetically sealed in any suitable way at its opposite ends to relatively rigid end walls 7 and 8. End wall 7 is attached to the strap 4 in any suitable way, the same being shown as provided with a plug or post 9 suitably secured in an aperture in said end wall and projecting through an aperture in the strap 4 in which it may be retained as by soldering or brazing. End wall 8 is provided with attaching means in the form of an exteriorly threaded post 10 also suitably secured in an aperture in said end wall, said post being shown as tubular in construction so as to provide a filling or charging passage for the thermostat.

Pivotally mounted in tubular member 1 is a butterfly valve member 11 of any suitable construction and material and preferably having a contour which consists of an ellipse cut off on both sides symmetrically with respect to its major axis along chords parallel to said axis, in conformity with the flattening of the sides of tubular member 1, so that the valve member is adapted to close completely the passage through the tubular member 1 when disposed diagonally with respect to the axis of the passage as shown in Fig. 1. Projecting from the up-stream face of valve member 11 is a bracket member 12 secured in any suitable way at its intermediate portion in an aperture or apertures 13 formed in said valve member, and extending through the opposed arms of said member 12 is a pivot pin 14 which extends through and is supported by the wall of the tubular member 1 as shown in Fig. 2. As will be seen from Fig. 1 pin 14 is so disposed that its axis intersects the axis of the tubular passage in member 1 but is displaced laterally with respect to the normal at the center of the valve member 11 toward the up-stream edge thereof.

Interposed between said post 10 and said member 12 is a link composed of a U-shaped member 15 which is apertured at its intermediate portion and suitably retained on a projection 16 extending from a tubular interiorly threaded cap or nut 17 received on said post 10. U-shaped element 15 is deflected laterally with respect to the axis of the thermostat, which is preferably coincident with the axis of the tubular element 1, and the two legs thereof are pivotally connected to the two legs of the member 12 by a transverse pivot pin 18 so disposed with respect to the pivot pin 14 that assuming the regulator unit occupies a vertical position as shown in Fig. 1, the pin 18 has equal extents of movement on the opposite sides of a transverse horizontal plane passing through the axis of the pivot pin 14 in the movement of the valve member from fully closed to fully open position. Therefore, the member 12 from the axis of pin 14 to the axis of pin 18 may be looked upon as a crank arm which moves to equal amounts on either side of a normal to the axis of the tubular member 1 where it intersects the axis of the pivot 14. As the arc of movement of the pivot 18 is relatively flat and therefore the pin 18 departs but slightly from a plane parallel to the axis of the tubular member 1, and by equal amounts as said pin 18 approaches either limit of its movement, the crank arm represented by the distance between the axes of pins 14 and 18 remains of substantially constant effective length so that there is substantially no variation in the leverage applied by the thermostat to the valve member during its opening and closing movements, whether the thermostat be restraining th movement of the valve member during the initial stages of its movement under the effective pressure of the cooling medium or be pushing or pulling on said valve member during the latter portion of its movement after the valve member has passed through its intermediate position of balance.

Thermostat 5 is charged with any suitable thermosensitive medium for predetermining the temperature at which the valve member starts to move. As the temperature of the cooling medium rises the effective pressure thereof on the valve member 11 tends to open said valve member, but the thermostat 5 resists such opening movement and holds the valve member in the position shown in Fig. 1. As the temperature continues to rise and reaches that temperature at which it is designed that the valve member shall start to open the charge within thermostat 5, by vaporization or expansion, causes the thermostat to expand, thereby permitting the pressure of the cooling medium to move the valve member, but under the restraint of the thermostat, as rapidly as the temperature of the cooling medium causes expansion of the thermostat. At an intermediate position the valve will reach a position of balance, and if the temperature thereafter continues to rise the further expansion of the thermostat exerts a pressure upon the valve member to continue the opening movement of the latter. At first the pressure required to continue the opening movement of the valve member is relatively slight, but gradually increases until the valve member reaches its wide open position in which it is substantially parallel to the axis of the tubular member 1.

When the temperature of the cooling medium begins to fall the effective pressure of the cooling medium tends to move the valve member toward closing position as rapidly as the thermostat is contracted, until the intermediate position of balance is reached, and thereafter continued contraction of the thermostat as the cooling medium continues to decrease in temperature causes the thermostat to pull the valve member further toward closed position, against a gradually increasing resistance, until the valve member reaches its fully closed position as shown in Fig. 1.

During this entire operation the effective length of the crank arm between the member connected to the thermostat and the member connected to the valve member is substantially invariable, and therefore the foregoing operation is not disturbed by any change of leverage arising from the motion-transmitting connections between the thermostat and the valve member.

As the connection of the member 12 to the valve member 11 is nearer the up-stream edge than the downstream edge thereof, the former has a shorter distance to move in passing from fully closed to fully open position, while the velocity pressure has a greater effect on the larger area between the normal to the valve member passing through the axis of pivot 14 and the downstream edge of the valve member. By varying the position of said pivot the effect of the kinetic action of the cooling medium on said valve member may be modified, as well as the intermediate position of the valve member at which it is fully balanced by the effective pressures so as to predeterminately vary the position to which the valve member tends to move under said pressures and the force required to continue its movement to its extreme position in either direction.

It will therefore be perceived that by the present invention a temperature regulator of the butterfly valve type has been provided which is composed of a relatively few number of relatively simple parts that can be easily fabricated and assembled, whereby the regulator unit can be manufactured at low cost and yet it is sensitively responsive to changes of temperature in the cooling medium to predetermine nicely the flow thereof. A substantial portion of the movement of the valve member in either direction from fully open or fully closed position is effected by the pressure of the cooling medium, and further movement of the valve member is only against a relatively small but gradually increasing resistance, so that the function of the thermostat is largely to hold the valve member in its various positions. Hence the thermostat can be made of relatively small, light and simple construction. So, also, the valve member, being formed as a flat plate with a contour as described, can be stamped from sheet metal, and the connections between the thermostat and the valve member, being of simple construction, can be readily formed from sheet metal or bar stock, while the tubular member 1 with its strap 4 may be formed by simple drawing and stamping operations, so that the entire unit can be produced inexpensively in large quantities by relatively unskilled labor.

While the embodiment of the invention illustrated on the drawing has been described with considerable particularity, it is to be expressly understood that the invention is not restricted thereto as the same is capable of receiving a variety of mechanical expressions, some of which will now readily suggest themselves to those skilled in the art, while changes may be made in the details of construction, arrangement and proportion of parts and certain features used without other features. Also, in its broader aspects, the principles of the present invention may be embodied in other ways taking more or less advantage of the improved operation and novel principle involved in the present invention. For example, the improved operation arising from the position of the pivotal axis of the valve member outside of the plane of the valve member may be used without a motion-transmitting means of substantially constant leverage or the latter may be used without employing the novel location of the pivot for the valve member. Reference is therefore to be had to the appended claims for a definition of said invention.

What is claimed is:

1. A temperature regulator for the cooling system of an internal combustion engine including a supporting member providing a tubular passage, a thermostat, means for mounting the same from said supporting member, a valve member in said tubular passage, said valve member being in the form of an ellipse whose sides have been flattened symmetrically with respect to and parallelly to its major axis and said passage having corresponding flattened sides, said valve member adapted to substantially close said tubular passage when said valve member is diagonally disposed with respect to the axis of said passage, means projecting from said valve member and constituting a crank arm therefor, means cooperating with said crank arm and providing a pivotal axis for said valve member, said pivotal axis intersecting the axis of said tubular passage but disposed at a substantial distance from said valve member and also displaced laterally with respect to the normal to said valve member where said valve member is intersected by the axis of said passage, and means pivotally connected to said crank arm and operatively connected to said thermostat, said means being movable longitudinally of said passage by the expansion and contraction of said thermostat to rotate said valve member bodily around said pivotal axis.

2. A temperature regulator according to claim 1 wherein said lateral displacement of the pivotal axis with respect to the normal to said valve member where it is intersected by the axis of said passage is toward the upstream side of said passage.

3. A temperature regulator according to claim 1 wherein the pivotal axis of the valve member is approximately midway between said valve member and a plane parallel to said valve member passing through the pivotal connection of said crank arm to the means operatively connected to the thermostat.

4. A temperature regulator according to claim 1 wherein the axis of said thermostat is disposed substantially in alignment with the axis of said passage and said means operatively connected to said thermostat and pivotally connected to said crank arm is laterally displaced with respect to the axis of said thermostat and passage.

5. A temperature regulator according to claim 1 wherein the pivotal connection of said crank arm to said means operatively connected to said thermostat is so disposed with respect to said pivotal axis that said pivotal connection is movable to substantially equal amounts on opposite sides of a line at right angles to the axis of said passage where it passes through said pivotal axis.

MARSHALL WARD.